United States Patent
Wu et al.

(10) Patent No.: US 8,236,919 B2
(45) Date of Patent: Aug. 7, 2012

(54) PROCESS FOR PREPARING A POLYETHER ETHER KETONE

(75) Inventors: Guirong Wu, Jilin (CN); Yuning Xie, Jilin (CN)

(73) Assignee: Jilin Jinzheng Macromolecule Materials R & D Co., Ltd., Jilin (CN)

( * ) Notice: Subject to any disclaimer, the term of this patent is extended or adjusted under 35 U.S.C. 154(b) by 0 days.

(21) Appl. No.: 12/957,216

(22) Filed: Nov. 30, 2010

(65) Prior Publication Data

US 2011/0218315 A1 Sep. 8, 2011

Related U.S. Application Data

(63) Continuation of application No. PCT/CN2008/073715, filed on Dec. 25, 2008.

(30) Foreign Application Priority Data

Jan. 11, 2008 (CN) .......................... 2008 1 0000647

(51) Int. Cl.
*C08G 8/02* (2006.01)
(52) U.S. Cl. ........................................ 528/125; 528/219
(58) Field of Classification Search .................. 525/125
See application file for complete search history.

(56) References Cited

U.S. PATENT DOCUMENTS

| | | | |
|---|---|---|---|
| 6,566,484 B2 | 5/2003 | Gharda et al. | 528/220 |
| 6,881,816 B2 | 4/2005 | Gharda et al. | 528/220 |

FOREIGN PATENT DOCUMENTS

| | | |
|---|---|---|
| CN | 1050615 | 4/1991 |
| CN | 1162602 | 10/1997 |
| CN | 1388146 | 1/2003 |
| CN | 1602325 | 3/2005 |
| CN | 101215365 | 7/2008 |
| EP | 0 174 207 | 3/1986 |
| JP | 1-182322 | 7/1989 |

OTHER PUBLICATIONS

International Search Report of International Application No. PCT/CN2008/073715, dated Apr. 2, 2009.

*Primary Examiner* — Shane Fang
(74) *Attorney, Agent, or Firm* — J.C. Patents

(57) ABSTRACT

A process for preparing a polyether ether ketone. Sodium carbonate is used alone as the condensation agent, and 4,4'-difluorodibenzophenone, p-benzenediol and biphenyldiol are subjected to polymerizing. After the corresponding prepolymer is obtained, the reaction temperature is elevated and p-benzenediol is further added as a chain extender to react for a period of time to produce high-viscosity polyether ether ketone.

3 Claims, No Drawings

PROCESS FOR PREPARING A POLYETHER ETHER KETONE

CROSS-REFERENCE TO RELATED APPLICATIONS

This application is a continuation of international application No. PCT/CN2008/073715 filed on Dec. 25, 2008, which in turn claims the priority benefits of China application No. 200810000647.9 filed on Jan. 11, 2008. The contents of these prior applications are hereby incorporated by reference in its entirety.

FIELD OF THE TECHNOLOGY

The present invention relates to a preparation method for engineering resin with special functions, in particular to a preparation method for polyether ether ketone (PEEK).

BACKGROUND

PEEK (polyether ether ketone), an aromatic linear high molecular polymer, not only has good processing performance, but also has excellent high-temperature resisting property. The load thermal deformation temperature of PEEK is as high as 315° C. and the temperature of continuous use is up to 260° C. Meanwhile, such polymer also has many remarkable performances of resisting abrasion, chemicals, fire, hydrolysis, radiation and the like. Therefore, in addition to the application in national defense and military, PEEK can also be widely used in such fields as aviation, automobile manufacturing, electronic apparatus, medical treatment, food, etc.

Structurally, PEEK is a polymer formed by the connection of ether bonds, ketone groups and aromatic rings. The chemical formula of PEEK is shown below:

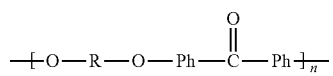

wherein the R group connected between the two ether bonds can be benzene, biphenyl or terphenyl, and therefore the preparation for PEEK can be carried out with hydroquinone, diphenol and diphenol triphenyl as initiators.

The synthesis method of PEEK was successfully developed for the first time by UK Victrex PLC in the late 1970s and put into industrial production in 1987, in which the preparation for PEEK was carried out through solution polycondensation reaction with diphenyl sulfone as the solvent in a salt-mixed system of $K_2CO_3/Na_2CO_3$ and with 4,4'-difluorobenzophenone (or 4,4'-dichlorobenzophenone) and hydroquinone as raw materials; afterwards, countries throughout the world went deep into the research, wherein the European Patent EP 0174207 reported the preparation process of PEEK through Friedel-Crafts reaction with $AlCl_3$ as a catalyst, the U.S. Pat. Nos. 6,881,816 and 6,566,484 applied by India Charda Corporation disclosed the preparation process of PEEK under a low temperature of 40 to 160° C. with phenoxyl-phenoxy benzoic acid as the only monomer and alkyl sulfonic acid as the solvent, and the Chinese Patent CN1050615C showed the preparation for a random copolymer of PEEK through high-temperature polycondensation of three monomers (4,4'-difluorobenzophenone, hydroquinone and diphenol) with the salt-mixed system of three components ($Na_2CO_3/K_2CO_3/SrCO_3$) as a condensing agent. So far, however, the existing technology for preparing PEEK with $Na_2CO_3$ as the only condensing agent has not been found yet.

In the existing technology for preparing PEEK, great advantages, either in terms of the product quality or the technological maturity, can still be found in the process of preparing PEEK through polycondensation of dihydroxy phenol and difluorobenzophenone. According to the experimental results disclosed, however, the salt-mixed system of $K_2CO_3/Na_2CO_3$ or $K_2CO_3/Na_2CO_3/SrCO_3$ is mostly adopted as the condensing agent and particularly the composite condensing agent with $K_2CO_3$ as the main component; but the composite condensing agent has the following problems: the content of impurities in the product is high due to strong water absorption of potassium carbonate and difficult crushing as well as screening; one-step charging cannot well control the viscosity of the PEEK product, which affects the batch stability of the product and meanwhile has certain impact on industrial production. In the condensation reaction, diphenol needs to first form corresponding phenol sodium or potassium salts together with sodium carbonate or potassium carbonate, wherein the activity of the phenol potassium salt is higher than that of the phenol sodium salt; therefore, the PEEK product with higher molecular weight can be easily generated during the polycondensation with difluorobenzophenone, but at the later stage of the reaction the probability of molecular collision lowers, the molecular weight can hardly increase to be high enough and the distribution of molecular weight is quite wide due to higher system viscosity; when sodium carbonate is used as the only condensing agent, the reaction is difficult to continue as soon as the molecular weight increases to a certain extent due to lower activity of the sodium carbonate; therefore, the PEEK product with lower molecular weight rather than that with higher molecular weight can usually be prepared.

SUMMARY

The present invention aims at providing a preparation method for PEEK (polyether ether ketone). Through the method, the viscosity of the PEEK product can be well controlled, the content of impurities in the prepared PEEK product decreases, the molecular weight is high, the distribution of molecular weight is narrow, and the batch stability of the product is enhanced as well.

The present invention provides a preparation method for PEEK, which is characterized by using $Na_2CO_3$ as the only condensing agent and adopting the addition of hydroquinone step by step, and particularly includes the following steps:

(1) during continuous stirring, the solvent of diphenyl sulfone is quickly added to a reactor and is then heated until dissolved, 4,4'-difluorobenzophenone, hydroquinone and diphenol are sequentially added, wherein 4,4'-difluorobenzophenone/(hydroquinone+diphenol)=1:1.1-1.2 (mol ratio), and another substance can only be added after the dissolution of the previous substance with regard to each addition of one substance;

(2) pre-dried anhydrous sodium carbonate is crushed and screened and is then quickly added to a reaction system according to the mol ratio of 4,4'-difluorobenzophenone/sodium carbonate of 1:1-3 to be continuously stirred for 30 to 50 minutes under 150 to 160° C. until phenol and sodium carbonate in the reaction system react to form sodium salts, the reaction temperature is then increased to 180 to 195° C., the formed sodium salts carry out polymerization reaction with the 4,4'-difluorobenzophenone for 30 to 50 minutes, the temperature of the reaction system is increased to 300 to 320° C.

within 10 minutes, and therefore the reaction speed is increased and the viscosity is enhanced;

(3) when the reaction is carried out for 1 to 1.5 hours and the viscosity of the system has little changes, the reaction temperature is increased to 320 to 330° C., hydroquinone is immediately added to the reaction system once again according to the mol ratio of 4,4'-difluorobenzophenone/hydroquinone of 1:0.01 to 0.5, the viscosity of the reaction system is quickly enhanced, the stirring is speeded up at the same time, and the heating is stopped after the reaction is carried out for 1 to 2 hours;

(4) finally, polymer viscous solution is directly and quickly poured into ice water to cool the product into a bulky solid, and the PEEK product is obtained through crushing, ethanol washing and drying of the bulky solid, wherein the hydroquinone which is added once again is used as a chain extender, and the mol ratio of hydroquinone to diphenol is 80:20 to 20:80.

The present invention is characterized in that: (1) on the basis of the characteristic that $Na_2CO_3$ has low activity when forming salt with diphenol, a prepolymer with uniform molecular weight is first prepared through polycondensation of $Na_2CO_3$ and difluorobenzophenone, and a chain extending monomer is then added to multiply the molecular weight so as to prepare a PEEK product with high molecular weight and narrow distribution of molecular weight; (2) $Na_2CO_3$ is used as the only condensing agent, which saves raw materials for production of the PEEK product, reduces impurities and improves the product quality; (3) owing to low price and easy availability of $Na_2CO_3$, the production cost is lowered; (4) compared with $K_2CO_3$, $Na_2CO_3$ is poor in water absorption, which avoids the frequent problems of difficult crushing, screening and charging during the production of the PEEK product when $K_2CO_3$ is used; (5) when the method of step-by-step addition is adopted and $Na_2CO_3$ is used as the only condensing agent, the reaction condition is mild and the production process is easy to control. Therefore, the preparation process of the PEEK product, which adopts the method of step-by-step addition and uses $Na_2CO_3$ as the only condensing agent, is an ideal method for production of the PEEK product.

DETAILED DESCRIPTION

Embodiments described below are not exhaustive but only further explanations to the present invention without any limitation.

Embodiment 1

A reactor equipped with a mechanical stirrer, a thermometer and a condenser is vacuumized and high-purity nitrogen is then repeatedly filled into the reactor three times to completely replace the air in the system with nitrogen, entry of the air is prevented by maintaining certain flow of nitrogen, 500.00 g of diphenyl sulfone is added and then heated until dissolved, 172.20 g of 4,4'-difluorobenzophenone (0.79 mol) is added and dissolved, 72.60 g of diphenol (0.39 mol) is added and dissolved, and 42.90 g of hydroquinone (0.39 mol) is added and dissolved; after the pre-dried $Na_2CO_3$ is crushed and screened, 95.40 g of powder (0.90 mol) is accurately weighed and immediately added to the reaction system to be stirred for 30 minutes, and then the powder and diphenol form salt and are dissolved; at the moment, the temperature of the system is quickly increased to 190° C., and is then increased to 300° C. within 10 minutes after the reaction is carried out for 30 minutes; after the reaction is carried out for 1 hour, the temperature is quickly increased to 325° C. and 1.10 g of hydroquinone (0.01 mol) is immediately added as the chain extender, the heating is stopped after the reaction is carried out for 1 hour at an increased stirring speed, the heated viscous polymer solution is immediately poured into ice water bath to be cooled into a bulky solid, the solid is then crushed into fine powder after being taken out and air-dried, the powder is subject to reflux boiling in a large amount of ethanol for 1 hour and then in distilled water for 1 hour after the ethanol is removed, this step is repeated three times to thoroughly remove diphenyl sulfone and inorganic salts in the system in order to obtain a pure PEEK product, and physical properties of the PEEK product is tested with the result shown in Table 1.

Embodiment 2

Under the same reaction conditions as Embodiment 1, the mol ratio of hydroquinone to diphenol in the first addition is changed into 1:2 and other conditions are not changed, namely 28.60 g (0.26 mol) of hydroquinone and 96.70 g (0.52 mol) of diphenol are added in the first addition, and the experimental result is shown in Table 1.

Embodiment 3

Under the same reaction conditions as Embodiment 1, the mol ratio of hydroquinone to diphenol in the first addition is changed into 1:3 and other conditions are not changed, namely 20.90 g (0.19 mol) of hydroquinone and 110 g (0.57 mol) of diphenol are added in the first addition, and the experimental result is shown in Table 1.

Embodiment 4

Under the same reaction conditions as Embodiment 1, the quantity of 4,4'-difluorobenzophenone is increased to 0.791 mol in the first addition, the quantity of hydroquinone is changed into 0.011 mol in the second addition and other conditions are not changed, namely 172.40 g of 4,4'-difluorobenzophenone is added in the first addition and 1.21 g (0.011 mol) of diphenol is added in the second addition, and the experimental result is shown in Table 1.

TABLE 1

| | | Embodiment 1 | Embodiment 2 | Embodiment 3 | Embodiment 4 |
|---|---|---|---|---|---|
| First Addition | Hydroquinone (mol) | 0.39 | 0.26 | 0.19 | 0.39 |
| | Diphenol (mol) | 0.39 | 0.52 | 0.57 | 0.39 |
| Second Addition | Hydroquinone (mol) | 0.01 | 0.01 | 0.01 | 0.015 |
| Properties | $\eta_{IV}$ | 1.29 | 1.34 | 1.47 | 1.30 |
| | Tg (° C.) | 162 | 167 | 175 | 164 |
| | Tm (° C.) | 340 | 369 | 411 | 350 |
| | Tensile Strength (Mpa) | 84 | 88 | 94 | 87 |
| | Elongation at Break (%) | 102 | 105 | 112 | 104 |

What is claimed is:

1. A preparation method for a PEEK (polyether ether ketone) product, characterized by using $Na_2CO_3$ as the only condensing agent and adopting the addition of hydroquinone step by step, and comprising the following steps that:

(1) during continuous stirring, the solvent of diphenyl sulfone is quickly added to a reactor and is then heated until dissolved, 4,4'-difluorobenzophenone, hydroquinone and diphenol are sequentially added, wherein 4,4'-difluorobenzophenone/(hydroquinone+diphenol)=1:1.1-1.2 (mol ratio), and another substance can only be added after the dissolution of the previous substance with regard to each addition of one substance;

(2) pre-dried anhydrous sodium carbonate is crushed and screened and is then quickly added to a reaction system according to the mol ratio of 4,4'-difluorobenzophenone/sodium carbonate of 1:1-3 to be continuously stirred for 30 to 50 minutes under 150 to 160° C. until phenol and sodium carbonate in the reaction system react to form sodium salts, the reaction temperature is then increased to 190 to 195° C., the formed sodium salts carry out polymerization reaction with the 4,4'-difluorobenzophenone for 30 to 50 minutes, the temperature of the reaction system is increased to 300 to 320° C. within 10 minutes, and therefore the reaction speed is increased and the viscosity is enhanced;

(3) when the reaction is carried out for 1 to 1.5 hours and the viscosity of the system has little changes, the reaction temperature is increased to 320 to 330° C., hydroquinone is immediately added to the reaction system once again according to the mol ratio of 4,4'-difluorobenzophenone/hydroquinone of 1:0.01 to 0.5, the viscosity of the reaction system is quickly enhanced, the stirring is speeded up at the same time, and the heating is stopped after the reaction is carried out for 1 to 2 hours;

(4) finally, polymer viscous solution is directly and quickly poured into ice water to cool the product into a bulky solid, and the PEEK product is obtained through crushing, ethanol washing and drying of the bulky solid.

2. The preparation method for the PEEK product according to claim 1, wherein the hydroquinone added in step (3) is used as a chain extender.

3. The preparation method for the PEEK product according to claim 1, wherein the mol ratio of hydroquinone to diphenol is 80:20 to 20:80.

* * * * *